United States Patent [19]

Reynolds

[11] 4,437,791
[45] Mar. 20, 1984

[54] CLAMP FOR HYDRAULIC HOSE BUNDLES

[76] Inventor: Graeme E. Reynolds, 10859 Church La., Houston, Tex. 77043

[21] Appl. No.: 364,998

[22] Filed: Apr. 2, 1982

[51] Int. Cl.³ .............................................. E02B 3/00
[52] U.S. Cl. ..................................... 405/195; 403/386
[58] Field of Search ............... 24/350; 175/7; 405/195; 403/344, 385, 386, 400

[56] References Cited

U.S. PATENT DOCUMENTS

| | | | |
|---|---|---|---|
| 1,834,838 | 12/1931 | Hingley | 403/385 |
| 2,107,407 | 2/1938 | Burton | 403/385 |
| 2,898,090 | 8/1959 | Rasmussen | 403/400 |
| 4,059,872 | 11/1977 | Delesandri | 403/385 |
| 4,228,857 | 10/1980 | Nobileau | 175/7 |

FOREIGN PATENT DOCUMENTS

| | | |
|---|---|---|
| 1711126 | 8/1967 | United Kingdom . |
| 1276068 | 2/1970 | United Kingdom . |
| 1425921 | 5/1972 | United Kingdom . |
| 1537257 | 10/1975 | United Kingdom . |
| 1535209 | 11/1975 | United Kingdom . |
| 2036849 | 10/1979 | United Kingdom . |
| 2097055 | 2/1982 | United Kingdom . |

OTHER PUBLICATIONS

Composite Catalog of Oil Field Equipment & Services for years 1976–1977, published by World Oil of Houston, TX 77001, pp. 1370 and 5345.

Primary Examiner—Dennis L. Taylor
Assistant Examiner—John A. Gungor
Attorney, Agent, or Firm—Pravel, Gambrell, Hewitt, Kirk & Kimball

[57] ABSTRACT

A clamping device secures a hydraulic hose bundle to a tubular riser system or to a wireline and comprises a generally cylindrical clamping body having an axial passage therethrough. The clamping body is formed having first and second semi-cylindrical body members and pivotal mount means provides pivotal movement of the first and second body members between an open and a closed position. First clamping means secures the first and second body members in the closed position and second clamping means releasably attaches the cylindrical clamping body to the tubular riser system or to a wireline.

11 Claims, 5 Drawing Figures

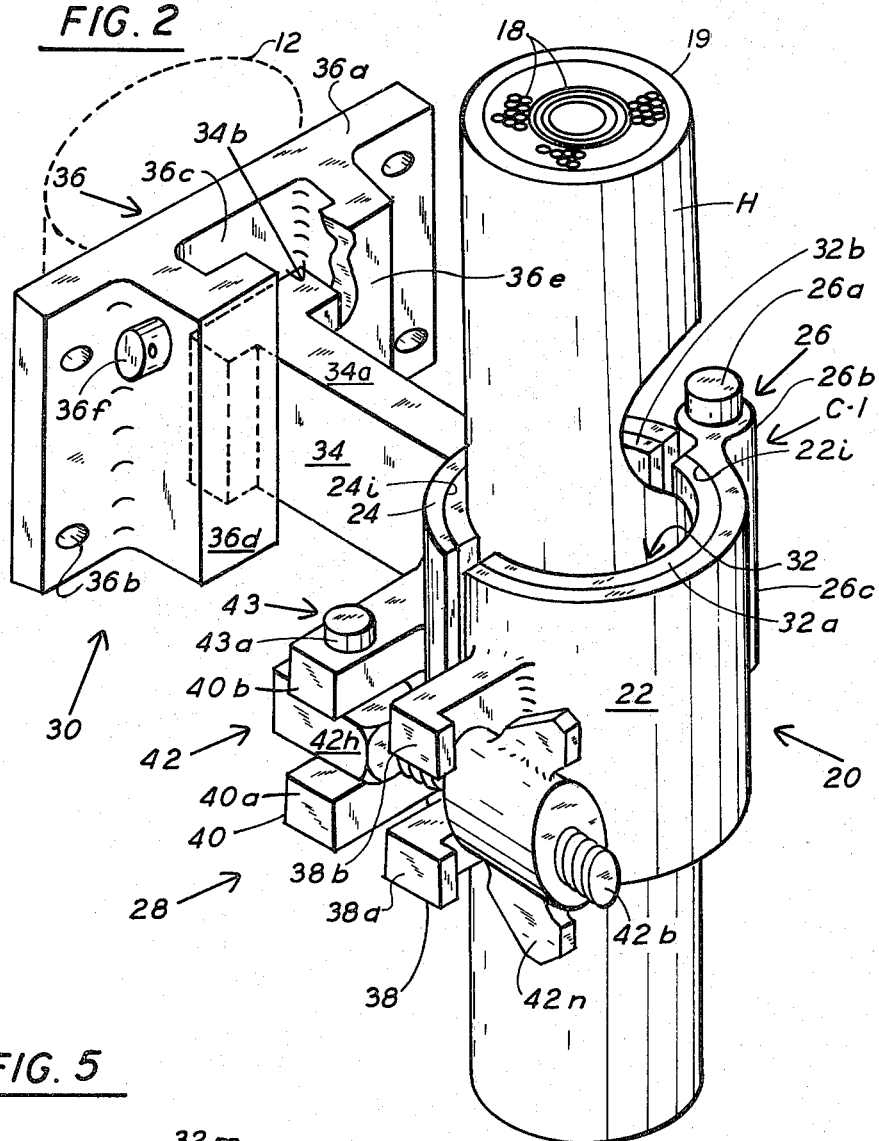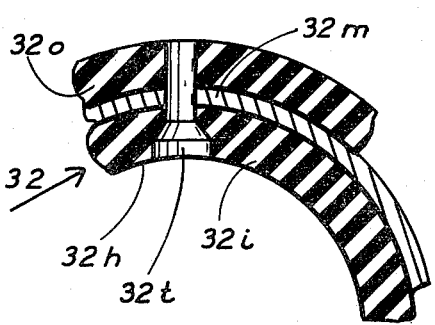

CLAMP FOR HYDRAULIC HOSE BUNDLES

BACKGROUND OF THE INVENTION a. Field of the Invention

This invention relates to the field of clamping devices for securing a hydraulic control hose bundle to a tubular riser system or a wireline.

b. Description of the Prior Art

A hydraulic hose or tube bundle used in oil well drilling and production is typically made of a plurality of individual or single-line hydraulic hoses bundled together in a compact design and having a plastic outer sheath. The diameter of the hydraulic hose bundle varies with respect to the desired number and size of hoses utilized. Typically in an offshore drilling operation such a bundle is used to transmit hydraulic fluid under pressure from control equipment located on an offshore oilwell platform to a control pod for a subsea blowout preventer stack. The hydraulic hose or tube bundle is flexible and generally extends for several hundred feet or more. Because the tube bundle is flexible and must extend several hundred feet or more from a surface platform to a control pod or a blowout preventer stack, it is necessary to attach the tube bundle to some type of support structure, which may be a cable or wireline, choke or kill lines or some supporting member of the riser.

It is known to attach the tube bundle to a series of clamps spaced along the extended cable or wireline. A type of control hose clamp known includes two clamping sections—pivotally connected by an exterior hinge and having an over center or off-center latch securing the control bundle and wireline between the two sections. Such control bundle clamps are manufactured in various sizes to conform to the various sizes of tube bundles utilized.

As offshore platforms and floating drilling rigs have ventured into deeper waters, the environment has become more of a problem to operating sub-surface through control hose bundles. The currents may be worse because of depth or even because of the area and the temperature of the water may even be a negative factor to the life of the control hose bundle. The light polyurethane that is utilized as the outer coating on tube bundles has a tendency to get torn up. The tube bundles are extremely expensive, and since it may be necessary to shut down a drilling rig if a control hose bundle is damaged to the extent that the control pod may not be operable, maintaining the integrity of the bundles is a very important consideration.

In the type of hose bundle clamp known, the metal arms of the clamp often would chafe and degrade the tube hose bundle around the clamped portion as the marine forces caused flexing of the intermediate sections of the control bundles.

SUMMARY OF THE INVENTION

The present invention relates to a new and improved clamping device to secure a hydraulic hose or tube bundle to a tubular riser system or to a wireline. The present invention makes it possible to use a standardized clamping body with a deformable sleeve to secure hydraulic hose bundles of varying sizes. The clamping device comprises a generally cylindrical clamping body having an axial passage through the clamping body. The clamping body is formed having first and second semi-cylindrical body members, with each body member having interior wall portions. A pivotal mount means operably connects the first and second body members for pivotal movement between an open and a closed position. First clamping means secures the first and second body members in the closed position and second clamping means, mounted with one of the first and second body members, removably attaches the cylindrical clamping body to either the tubular riser system or wireline.

This summary of the invention is not intended to be exhaustive of all features of the invention and the claims are intended to set forth the details of the invention.

BRIEF DESCRIPTION OF THE DRAWINGS

FIG. 2 is a perspective view of the embodiment of the present invention for attaching to a tubular riser system;

FIG. 5 is a partial cross-sectional view of the deformable sleeve.

DESCRIPTION OF THE PREFERRED EMBODIMENT

Figure 1:
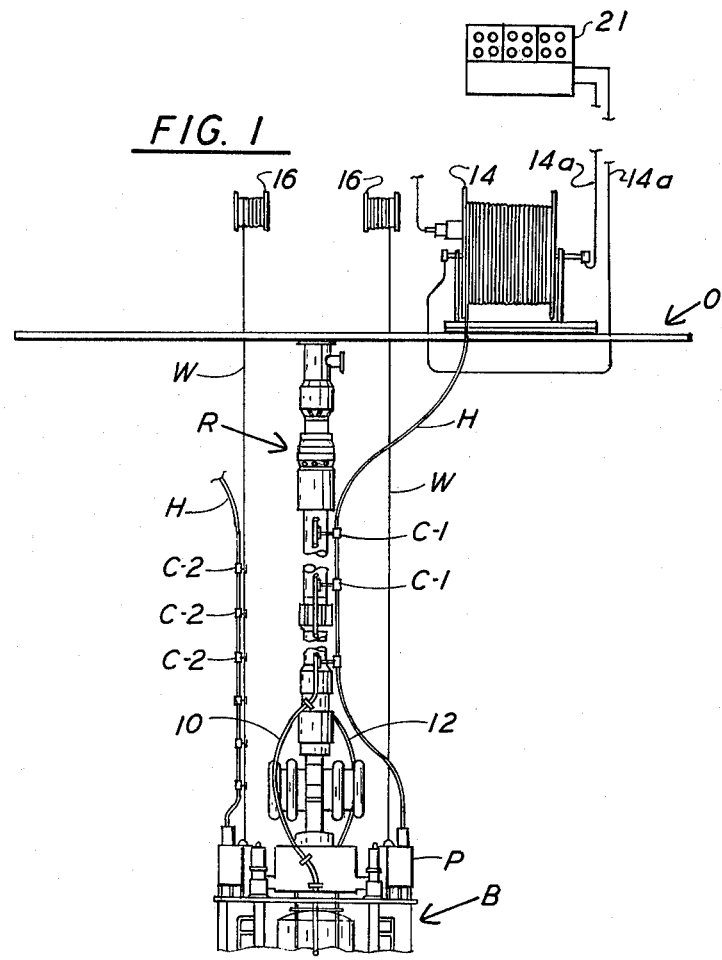
FIG. 1 is a schematic diagram of a marine hydraulic control system with one embodiment of the present invention mounted upon a tubular riser system and a second embodiment mounted upon a wireline.

Referring now to FIG. 1, a marine hydraulic control system for an offshore oilwell platform O is depicted. A blowout preventer stack (BOP) B is connected to the offshore oilwell platform through a tubular riser system R. Generally the tubular riser system R includes choke and kill lines 10 and 12, respectively, which control the failsafe operation of the BOP stack. Hydraulic power and control hoses or tube bundles H extend between tube bundle reels such as 14 and hydraulic control pods P connected to the BOP stack B. Wirelines W extend between wireline reels 16 mounted with the offshore oilwell platform O and the hydraulic control pods P, each wireline providing support through a series of clamps C-2 of one embodiment (FIGS. 3-4) of this invention to the tube bundle H. In another embodiment (FIG. 2) of this invention, the series of clamps C-1 attaches a hose bundle to the choke line 10 or the kill line 12.

Figure 3:
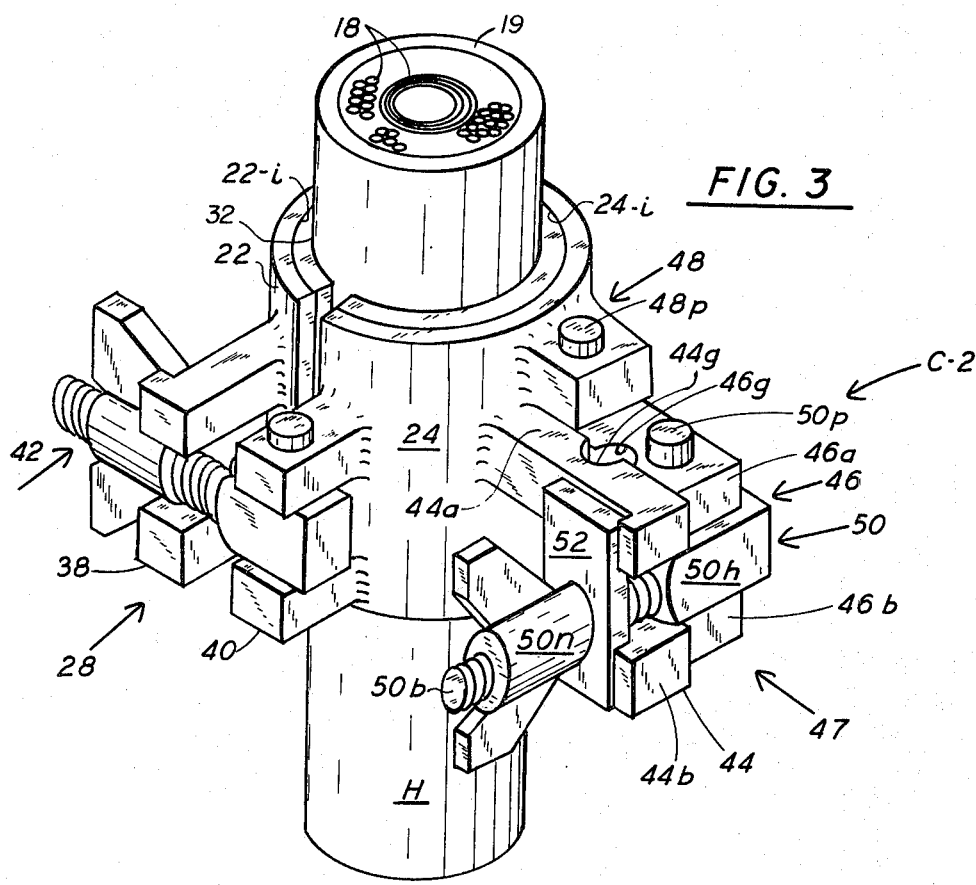
FIG. 3 is a perspective view of the embodiment of the present invention for attaching to a wireline.

Referring to FIGS. 2 and 3, the hydraulic hose bundle H is composed of a plurality of individual hydraulic single-line hoses 18 of various sizes combined in a compact design and encased with a plastic outer sheath 19. Referring to FIG. 1, a hydraulic power unit with a hydraulic control panel 21 transmits hydraulic fluid through hoses 14a and through the individual hoses 18 of the hydraulic hose bundle H to the BOP stack B for operating the various valves and functions associated with the preventer system.

In a marine environment, the flexible hydraulic hose bundle H is subject to frequent flexing due to the marine forces such as currents. Hydraulic hose bundle clamps C-1 and C-2 are used to secure and protect the hose bundle H against such undesired stresses. The clamping devices C-2 of the present invention mount with the wireline W which extends between the wireline reel 16 on the offshore oilwell platform O and the hydraulic control pod P (FIGS. 3 and 4); and, the clamping device C-1 attaches this hose bundle H to the tubular riser system R (FIG. 2).

TUBULAR RISER SYSTEM CLAMP OF FIG. 2

The tubular riser system embodiment C-1 of the clamping device of the present invention is particularly adapted to secure a hydraulic hose bundle H, which extends between the offshore oilwell platform O and a subsea control pod P, to a tubular riser system R and specifically, to the choke line 10 or the kill line 12 of the tubular riser system R.

Referring now to FIG. 2, a generally cylindrical clamping body 20 is formed having an axial passage through the clamping body 20 for receiving a hydraulic hose bundle H therethrough. The clamping body 20 is further formed having first and second generally semi-cylindrical body members 22 and 24. The body member 22 has a semi-cylindrical interior wall portion 22i and the body member 24 similarly has a semi-cylindrical interior wall portion 24i. Pivotal mount means 26 operably connects the first and second body members 22 and 24 and mounts the first and second body members 22 and 24 for pivotal movement between an open position, in which the hydraulic hose bundle H can be placed within the clamping body 20, and a closed position, in which the hydraulic hose bundle H is secured within the axial passage of the clamping body 20 of the clamping device C-1.

A bundle clamping means 28 is mounted with the first and second body members 22 and 24 for securing the first and second body members 22 and 24 in the closed position about the hydraulic hose bundle H with the interior wall portions 22i and 24i of body members 22 and 24 in secure engagement through sleeve 32 with the hydraulic hose bundle H. Choke and kill line clamping means 30 is mounted with body member 24 independently of the bundle clamping means 28 and extends laterally from the body member 24 for removably attaching the generally cylindrical clamping body 20 to the choke line 10 or the kill line 12 riser system R.

The deformable sleeve 32 is mounted within the interior walls 22i and 24i of the body members 22 and 24 for resiliently engaging the hydraulic hose bundle H. Since the diameter of hydraulic hose bundles H varies with respect to the desired number of hoses, the deformable sleeve 32 is of varying sizes and thicknesses in order to adapt the clamping body 20 to engage different diameters of the hydraulic hose bundles H.

Referring particularly now to FIG. 5 which shows a preferred embodiment of the deformable sleeve 32 in greater detail, deformable sleeve 32 comprises an outer layer 32o, an inner layer 32i, and a middle layer 32m disposed between the outer layer 32o and inner layer 32i. Generally, outer layer 32o and inner layer 32i are composed of a deformable material of a hard rubber such as Buna-N or plastic. Middle layer 32m preferably is a semi-cylindrical metallic plate. The deformable sleeve 32 includes two semi-cylindrical sections 32a and 32b mounted, respectively, with interior wall portion 22i and 24i of the body members 22 and 24. When the first and second body members 22 and 24 are in the closed position, the interior wall portion 32h of the deformable sleeve 32 engages the outer sheath of the hydraulic hose bundle H, and the longitudinal edges of the deformable sleeve section 32a mounted with body member 22 and the sleeve 32b mounted with body member 24 are in contact or a relatively small distance apart.

The deformable sleeve 32 is mounted with the first or second body members 22 and 24 with a bolt or other suitable means inserted through the countersunk holes 32t in the deformable sleeve 32 into the body members.

Referring again to FIG. 2, pivotal mount means 26 forms a hinge which includes a pivot pin 26a which passes through axial openings formed in alternately spaced, aligned pivot fingers 26b with body member 22 and pivot fingers 26c formed with body member 24.

The first clamping means 28 of the tubular riser system includes a first yoke 38 extending from the body member 22 and a second yoke 40 extending from the body member 24. Yokes 38 and 40 are formed diagonally opposite the hydraulic hose bundle H from pivotal mount means 26.

Yoke connector means 42 releasably connects the first and second yokes 38 and 40 together when body members 22 and 24 are in the closed position with the hydraulic hose bundle H secured therebetween.

The first yoke 38 includes a first finger 38a and a spaced-apart second finger 38b extending laterally from the body member 22. The second yoke 40 includes a first finger 40a and a spaced-apart second finger 40b formed extending laterally from the second body member 24. The yoke connector means 42 includes a threaded swing bolt 42b having a rectangular cross-sectional head portion 42h. Bolt head pivotal mount means 42p includes a pin 43a extending through the fingers 40a and 40b for pivotally mounting the swing bolt 42b. The fingers 38a and 40a and 38b and 40b are aligned to allow the swing bolt 42b to pivot to a closed position in which the threaded portion of the bolt 42b is positioned between spaced fingers 38a and 38b.

A threaded wing nut 42n is mounted over the threaded bolt 42b and is rotated into engagement with fingers 38a and 38b to secure the closing of body members 22 and 24.

The second clamping means 30 of the tubular riser system embodiment C-1 includes an arm 34 extending laterally from the body member 24. The arm 34 includes a rectangular bar 34a formed having a base member or foot 34b dimensionally wider than the bar which extends laterally from body member 24. Generally, base 34b and bar 34a form a "T" as viewed from above.

Tubular riser system mount means 36 is attached to the tubular riser system R, and, in particular, to the choke line 10 or the kill line 12 thereof illustrated in a dotted line in FIG. 2. The tubular riser system mount means 36 includes plate 36a which is connected to the choke line 10 or kill line 12 through U-shaped bolts (not shown) which extend about the line 10 or 12 and through openings 36b in plate 36a. A slot 36c is formed on plate 36a by aligned L-shaped sections 36d and 36e for receiving the base member 34b of arm 34 to removably attach the clamping body 20 to the tubular riser system R. A removable pin 36f spans the upper opening of slot 36c to removably secure the base member 34b from slot 36c, which has a permanent bottom section (not shown) extending across the L-shaped sections 36d and 36e.

WIRELINE EMBODIMENT OF FIGS. 3 AND 4

Figure 4:
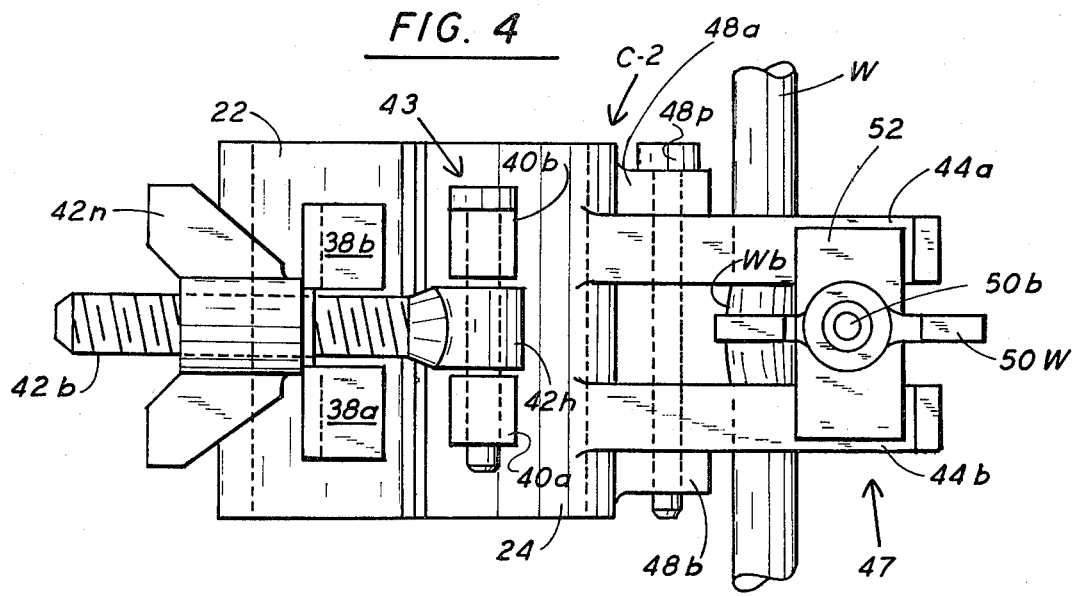
FIG. 4 is a side view of the second clamping means of FIG. 3.

Referring now to FIGS. 3 and 4, like numbers refer to like elements as described above. The wireline embodiment of the clamping device C-2 is adapted to secure the hydraulic hose bundle H to the wireline W extending between an offshore oilwell platform and a subsea control pod P. A generally cylindrical body 20 having an axial passage through the body 20 receives a hydraulic hose bundle H. The clamping body 20 is formed of semi-cylindrical body members 22 and 24, with each of the first and second body members 22 and 24 having a semi-cylindrical interior wall portion 22i and 24i, respectively. Pivotal mount means 26 (not shown in FIG. 3, but see FIG. 2) operably connects with the first and second body members 22 and 24 and mounts the first and second body members 22 and 24 for pivotal movement of the body members 22 and 24 between an open position and a closed position.

First clamping means 28 mounted with the first and second body members 22 and 24 secures the first and second body members 22 and 24 in a closed position about the hydraulic hose bundle H with the interior wall portions 22i and 24i of the body members 22 and 24 in secure engagement with the hydraulic hose bundle H through deformable sleeve 32. Second clamping means 47 is mounted with body member 24 independently of the first clamping means 28 and extends laterally from the body member 24. Second clamping means 47 releasably attaches the cylindrical clamping body 20 to the wireline W, which extends between the well platform and subsea control pod P.

The deformable sleeve 32 is mounted with the interior wall portions 22i and 24i of the body members 22 and 24 for resiliently engaging the hydraulic hose bundle H. The deformable sleeve 32 is of varying sizes and thicknesses adapted to engage different diameters of hydraulic hose bundles.

The first clamping means 28 of the wireline embodiment is as described above with respect to the tubular riser system embodiment. A first yoke 38 is formed extending laterally from the first body member 22 and a second yoke 40 is formed extending laterally from the second body member 24. A yoke connector means 42 releasably connects the first and second yokes 38 and 40 together with the hydraulic hose bundle H positioned in the axial passage through the clamping body 20.

The first yoke 38 includes a first finger 38a and a spaced-apart second finger 38b extending laterally from the first body member 22. The second yoke 40 includes a first finger 40a and a spaced-apart second finger 40b extending laterally from the second body member 24. The yoke connector means 42 includes a threaded swing bolt 42b having a head 42h with rectangular cross-sectin. Bolt head pivotal mount means 43 operably connects with the yoke 40 between the first and second fingers 40a and 40b mounting the threaded bolt 42b for pivotal movement between an engaged position and a non-engaged position. A threaded wing nut 42n is threadedly mounted over the threaded bolt 42b and engages the fingers 38a and 38b to secure the body members 22 and 24 in the closed position.

The second clamping means 47 of the wireline embodiment C-2 includes a first yoke 44 formed extending laterally from the body member 24. The first yoke 44 includes spaced fingers 44a and 44b each having a groove 44g formed therein to receive the wireline W. A yoke mount means 48 mounts a second, movable or pivotal yoke 46 for pivotal movement with respect to the first yoke 44. The second, movable yoke 46 includes spaced fingers 46a and 46b each having a groove 46g alignable with the groove 44g in the first yoke 44. Yoke connector means 50 releasably connects the first and second yokes 44 and 46 with the wireline W positioned in the aligned grooves 44g and 46g in the fingers of first and second yokes 44 and 46.

The yoke mount means 48 comprises a retaining pin 48p extending through aligned bores in spaced lugs 48a and 48b mounted on second body member 24 and the second, movable yoke 46 (fingers 46a and 46b) is disposed between lugs or arms 48a and 48b. In this manner, the yoke 46 including fingers 46a-b are movable to a closed position in which the wireline W is positioned in grooves 46g of fingers 46a and 46b and grooves 44g of fingers 44a and 44b.

Preferably the yoke connector means 50 includes a threaded swing bolt 50b having a rectangular cross-sectional head 50h. Pin 50p extending through fingers 46a and 46b connects the threaded bolt 50b for pivotal movements between open and closed positions. A threaded wing nut 50n is adapted to threadedly connect onto the threaded bolt 50b in the engaged position for securing the first and second yokes 44 and 46 together with the wireline W positioned in the aligned grooves 44g and 46g in the fingers of first and second yokes 44 and 46.

A retainer plate 52 mounted with threaded bolt 50b extends between first finger 44a and second finger 44b of first yoke 44. In the engaged or closed position of threaded bolt 50b, wing nut 50n engages retainer plate 52 which provides the wing nut with greater area to draw together yoke 46 to yoke 44. The size of grooves 44g and 46g are such that in the compressed or clamped state, the wireline W forms a bulged portion Wb (FIG. 4), which causes a resistance to longitudinal movement of the clamping device C along the wireline W.

OPERATION

In operation of the tubular riser system embodiment clamp C-1 of FIG. 2, the tubular riser mount means 36 is mounted with the choke line 10 or kill line 12 of the tubular riser system R. U-bolts (not shown) are passed around the selected line and bolted to the tubular riser mount means plate 36a through holes 36h. The base 34b of arm 34 is placed within groove 36c of tubular riser mount means. Pin 36f is placed in mount means 36 across groove 36c to secure the base 34b in groove 36g.

Once the clamping device C-1 is attached to the tubular riser system R, the hydraulic hose bundle H can be then secured in the clamping body 20. Having first chosen the desired thickness of the deformable sleeve 32, the clamping body 20 is placed in the open position and the hydraulic hose bundle H is positioned in the axial passage. The first and second body members 22 and 24 are then pivoted to the closed position and swing bolt 42b is pivoted into the closed position. Wing nut 42n is screwed further onto bolt 42b until contact with fingers 38a and 38b of first yoke 38. The threading of wing nut 42n is continued until the desired compression of the hydraulic hose bundle H between body members 22 and 24 is achieved.

In operation of the wireline embodiment C-2 of the present invention, FIGS. 3 and 4, the clamping device C-2 is first attached to the wireline W. The wireline W is placed in the passage formed by the aligned grooves 44g and 46g. The swing bolt 50b is then pivoted to the closed position and the retainer plate 52 with wing nut 50n is then screwed further onto bolt 50b. Wing nut 50n is threaded upon bolt 50b until the desired compression is achieved locking the clamping device C onto wireline W, which is so compressed between the grooves 44g of fingers 44a and 44b and the grooves 46g of fingers 46a and 46b that a bulged wireline portion Wb is created.

The hydraulic hose bundle H can at this point be secured in the clamping body 20 in the same manner as described above with reference to the tubular riser system embodiment.

The present invention secures a hydraulic hose bundle to either the wireline W or to the tubular riser system, as desired by the user. A single size of clamping body 20 can be maintained by the user with a selection of various thicknesses of deformable sleeves 32 to adapt the clamping devices C-1 and C-2 to secure varying diameters of hose bundles H.

The interior layer 32i of the deformable sleeve 32 markedly reduces chafing and degradation of the outer sheath 90 of the hydraulic hose bundle H by elimination of any metal to plastic contact. The plastic to plastic contact between the inner layer 32i of deformable sleeve 32 and the outer sheath of the hydraulic hose bundle H additionally increases the frictional engagement of the clamping devices C-1 and C-2 to the hydraulic hose bundle H.

The foregoing disclosure and description of the invention are illustrative and explanatory thereof, and various changes in the size, shape and materials, as well as in the details of the illustrated construction may be made without departing from the spirit of the invention. For example, while the clamping devices of this invention are disclosed principally in a drilling situation, they may also be used in oil and gas production situations.

I claim:

1. In a marine hydraulic control system for an offshore oilwell platform, a clamping device adapted to secure a hydraulic hose bundle to a tubular riser system, said hydraulic hose bundle extending between the well platform and a subsea control pod, comprising:
 a generally cylindrical clamping body having an axial passage through said body for receiving such a hydraulic hose bundle;
 said clamping body being formed of first and second generally semi-cylindrical body members, each of said first and second body members having a semi-cylindrical interior wall portion;
 pivotal mount means operably connected with said first and second members and mounting said first and second body members for pivotal movement between an open position and a closed position;
 first clamping means mounted with said first and second body members for securing said first and second body members in said closed position about such hydraulic hose bundle with said interior wall portions of said body members in secure engagement with such hydraulic hose bundle;
 second clamping means mounted with one of said first and second body members independently of said first clamping means and extending laterally from said one body member for removably attaching said generally cylindrical clamping body to said tubular riser system;
 said second clamping means including an arm formed extending laterally from said body member, said arm having at its outer end a base member wider than said arm;
 tubular riser system mount means adapted for attachment to said tubular riser system; and
 said tubular riser system mount means having a groove formed therein for receiving said base member of said arm to removably attach said clamping body to the tubular riser system.

2. The clamping device of claim 1 wherein said interior portion of each of said first and second semi-cylindrical body members include:
 a deformable sleeve mounted with said body members for resiliently engaging such hydraulic hose bundle.

3. The clamping device of claim 2 wherein said deformable sleeve is of varying sizes adapted to engage different diameters of hydraulic hose bundles.

4. The clamping device of claim 1 wherein the tubular riser system mount means further includes:
 removable pin means mounted with said tubular riser system mount means for releasably securing said base member against removal from said groove.

5. The structure set forth in claim 1, wherein said second clamping means further includes:
 said tubular riser mount means including a plate adapted to be connected to such tubular riser system; and,
 opposing L-shaped sections formed on said plate and cooperating to form said groove for receiving said base member.

6. The structure set forth in claim 5 including:
 a pin removably attached to said opposing L-shaped sections and extending across said groove to removably secure said base member in said groove.

7. In a marine hydraulic control system for an offshore oilwell platform, a clamping device adapted to secure a hydraulic hose bundle to a wireline extending between the well platform and a subsea control pod, comprising:
 a generally cylindrical body having an axial passage through said generally cylindrical body for receiving such a hydraulic hose bundle;
 said generally cylindrical body being formed of first and second generally semi-cylindrical body members, each of said first and second body members having a semi-cylindrical interior wall portion;
 pivotal mount means operably connected with said first and second body members and mounting said first and second body members for pivotal movement between an open position and a closed position;
 first clamping means mounted with said first and second body members for securing said first and second members in a closed position about such hydraulic hose bundle with said interior wall portions of said body members in secure engagement with such hydraulic hose bundle;
 second clamping means mounted with one of said first and second body members independently of said first clamping means and extending laterally from said one body member for releasably attaching said generally cylindrical clamping body to such wireline extending between the well platform and subsea control pod;
 second clamping means including a first yoke extending laterally from said one body member and having a groove to receive the wireline;
 a second yoke and yoke mount means attached to said body and mounting said second yoke for pivotal movement with respect to said first yoke, said second yoke having a groove alignable with said groove in said first yoke, the combined size of said alignable grooves being sufficient to cause a bulge in such cable to prevent relative movement of said cable; and yoke connector means for releasably connecting said first and second yoke together with the wireline positioned in said aligned grooves in said first and second yokes.

8. The clamping device of claim 7 wherein said interior wall portion of each of said first and second semi-cylindrical body members includes:

a deformable sleeve mounted with said body members for resiliently engaging such hydraulic hose bundle.

9. The clamping device of claim 8 wherein said deformable sleeve is of varying sizes adapted to engage different diameters of hydraulic hose bundles.

10. The clamping device of claim 7 wherein said yoke connector means includes:

a threaded bolt;

bolt pivotal mount means operably connected with said second yoke for pivotal movement of said threaded bolt to a closed position; and, a threaded nut threadedly mounted over said threaded bolt for securing said first and second yokes together with the wireline positioned in said aligned grooves in said first and second yokes.

11. The structure set forth in claim 7, wherein said second clamping means further includes:

said first yoke includes first and second spaced fingers extending outwardly from said one body member, each of said spaced fingers having a groove formed therein to receive such wireline;

said second yoke including third and fourth spaced fingers extending outwardly from said one body member, each of said third and fourth spaced fingers having a groove therein, said third and fourth spaced fingers being pivotally attached to said one body member;

said first and second and third and fourth spaced fingers being axially spaced from each other with said first and third fingers and said second and fourth fingers being alignable so that the grooves therein are alignable;

said first and third finger and said grooves therein cooperating to receive and grip such wireline; and, said second and fourth finger and said grooves therein cooperating to receive and grip such wireline at an axially spaced point in order to grip such wireline and create a bulged area in such wireline between said grooves of said first and second fingers and said grooves of said third and fourth fingers.

* * * * *